United States Patent Office 3,694,369
Patented Sept. 26, 1972

3,694,369
SELECTIVE ION EXCHANGE FOR THE ISOLATION OF CERTAIN ALKALINE EARTHS
Kent A. Orlandini, West Chicago, Ill., assignor to the United States of America as represented by the United States Atomic Energy Commission
No Drawing. Filed May 11, 1971, Ser. No. 142,361
Int. Cl. G21c 19/46
U.S. Cl. 252—301.1 R                    9 Claims

ABSTRACT OF THE DISCLOSURE

A process for the separation of strontium and barium from other metal values wherein the strontium, barium and other metal values are dissolved in a solvent solution of water, pyridine, acetic acid and glycolic acid and the resulting solution is contacted with a cation exchange resin whereby only the strontium and barium are adsorbed on the resin. Following washing of the resin, the strontium and barium are subsequently eluted therefrom.

CONTRACTUAL ORIGIN OF THE INVENTION

The invention described herein was made in the course of, or under, a contract with the United States Atomic Energy Commission.

BACKGROUND OF THE INVENTION

The invention relates generally to a process for separating strontium and barium from other metal values. More particularly, the invention relates to separation of strontium and barium from other metal values by an ion exchange process. Still more particularly, the invention relates to an ion exchange process for separating strontium and barium from a mixture of fission products obtained as a waste solution from the processing of irradiated nuclear reactor fuel material for the recovery of uranium and plutonium.

When fuel elements from a nuclear reactor are processed for recovery of unspent reactor fuel material, a waste solution is obtained which contains the fission products initially associated with the fuel. It is desirable to separate many of the fission products which have intermediate or long half-lives from the waste solution prior to its disposal in order to facilitate handling and storage. It is also desirable to obtain many of these fission products in as pure form as possible as they have many beneficial uses. Among the most useful of these fission products is strontium-90. Strontium-90 has an intermediate half-life of 28 years and is a beta-emitter. Because it does not give off gamma radiation, strontium-90 has been used extensively as a heat source in thermoelectric generators.

A variety of processes have been developed for the separation of strontium from fission product mixtures. These include precipitation, coprecipitation with a carrier, liquid extraction, and ion exchange. Previous ion exchange separation processes have involved complex series of steps. Jansen et al., U.S. Pat. 3,154,500, preceded an ion exchange with liquid extractions. In the ion exchange process step, Jansen et al. relied upon adsorption of strontium on the resin while maintaining other values in solution as complexes. Complexing agents used or suggested by Jansen et al. were ethylenediaminetetraacetic acid (EDTA), diethylenetriaminepentaacetic acid (DTPA), N - hydroxyethylethylenediaminetriacetic acid (HEEDTA), their sodium salts, and citric acid. Wheelwright et al., U.S. Pat. 3,173,757, employ as a complexing agent either HEEDTA, tartaric acid, or citric acid. Wheelwright et al. as well as Jansen et al. require adjustment of the pH of the solutions involved. Prior processes also have not been entirely satisfactory for separation of strontium from the alkali metals as the alkali metals are not readily complexed. Since complexing ions are used to maintain the fission products in solution while the strontium adsorbs on the resin, inability to complex the alkali metals has resulted in poor separation from these metals.

Accordingly, it is an object of the present invention to provide a process for the separation of strontium and barium from other metal values.

It is another object of the present invention to provide a process for the separation of strontium and barium from a radio-active waste solution from a processed reactor fuel material.

It is a further object of this invention to provide a process for satisfactory separation of strontium and barium from alkali metals.

Another object of this invention is to provide a process for separating strontium and barium which is relatively simple and does not require numerous or elaborate steps.

Finally, it is an object of the present invention to provide a process for the separation of strontium and barium by adsorption on and subsequent elution from an ion exchange resin where only small amounts of materials are required.

SUMMARY OF THE INVENTION

Strontium and barium are separated from other metal values by an ion exchange process. According to the present invention, the strontium and barium are selectively adsorbed on the ion exchange resin while the other metal values remain in solution or are washed from the resin by the eluent solution. The selective adsorption is accomplished in the present instance by dissolving the values in a solvent solution of water, pyridine, glacial acetic acid and glycolic acid. The resulting feed solution is used as the eluent solution for the ion exchange process and is contacted with the resin whereby the strontium and barium are adsorbed. The resin is then washed and the barium and strontium are subsequently removed as is the standard practice in ion exchange processes.

SPECIFIC EMBODIMENT OF THE INVENTION

According to the present invention, a feed solution is formed by dissolving the strontium and barium values together with the rare earth metal values, alkali metal values and other metal values in a solvent solution of water, pyridine, glacial acetic acid and glycolic acid. Some of the metal values will form complexes with the acetate and glycolate ions from the acetic acid and glycolic acid, respectively. Since the metal values are present as complexes, they are not retained on the ion exchange resin but rather remain in solution and are washed away as the eluent solution passes over the resin. Strontium and barium are not strongly complexed but are strongly bonded to the exchange resin. Strontium and barium are consequently selectively adsorbed onto the resin. Similarly the alkali metals do not readily form complexes and normally they too would be retained on the resin. However, in the practice of the present invention, they are not retained on the ion exchange resin. It is believed that the alkali metals are adsorbed to some extent on the resin but are almost immediately displaced. The proposed explanation for this is the pyridinium cation which is formed in the solution by the reaction of pyridine with the acids present. It is believed that the pyridinium ion displaces the alkali metals from the resin and in effect keeps them in solution. Barium and strontium, in addition to being less strongly complexed by the glycolate ions, are the least displaced by the pyridinium cation. Consequently, the barium and strontium are selectively retained on the ion exchange resin.

Although the composition of the solvent solution of the present invention can be varied, preferably the composition is within given defined ranges. These ranges and compositions are defined in terms of percent volume and where percent appears hereafter, percent volume is implied. The compositions by percent volume can be readily converted to any other measure of concentration and is not of any significance in itself. In the present instance, the solution should contain 65% to 75% of water. It was found that when the solution contained less than 60% water, other metals were retained on the resin. It is believed that this is due to the fact that the metals are carried in solution as complexes and salts. Therefore it is necessary to have sufficient water present to dissolve these salts and maintain the values in solution. On the other hand, too high a percentage of water means a reduction in the concentration of complexing ion and correspondingly the other metal values will adsorb on the resin as there will be insufficient complexing ion present. One of the functions of the acetic acid is to supply some of the complexing ions. It was found that there was insufficient complexing when less than 5% acetic acid was used. Since it is not desirable to have the solution too acidic, the acetic acid should not exceed 10%. Similarly the concentration of the complexing glycolate ion can be varied by varying the glycolic acid concentration between 0.05 M to 0.2 M. The pyridine should range from 20% to 25% with an increase in the concentration corresponding to an increase in acetic acid and a decrease in water.

While the composition can be varied within the above ranges, it has been found that a preferred composition has given the best results. In the preferred composition, the solvent solution is composed of 70% $H_2O$, 20% pyridine, 10% glacial acetic acid, said solvent solution being 0.1 M in glycolic acid.

The following table of distribution coefficients illustrates the degree of separation obtainable using the preferred composition and the ion exchange resin Dowex 50. Dowex 50 is a cation exchange resin and its preparation is described in Example I of U.S. Pat. 2,366,007 granted to D'Alelio on Dec. 26, 1944. The distribution coefficient, $K_d$, is defined as the number of milliliters of the solvent solution necessary to move essentially all of the given ion off 1 gram of the ion exchange resin. For example, while it requires less than 1 ml. of the solution to move essentially all of the thorium from 1 gram of the resin, it would take 1000 ml. to move all the barium from 1 gram of the resin.

Distribution coefficients of various elements on Dowex 50 in 70% (v.) $H_2O$, 20% (v.) pyridine, 10% (v.) glacial acetic acid and 0.1 M in glycolic acid

| Element: | $K_d$ |
|---|---|
| Ba | 1000 |
| Sr | 280 |
| Ca | 101 |
| Mg | 11 |
| Na | 6 |
| Cs | 9 |
| Sc | <1 |
| Y | <1 |
| La | 19 |
| Ce | 5 |
| Yb | <1 |
| Eu | <1 |
| Am | <1 |
| Zr | <v |
| Hf | <1 |
| Th | <1 |
| Nb | <1 |
| Pa | <1 |
| $Cr^{III}$ | 3 |
| $Mo^{VI}$ | <1 |
| $U^{VI}$ | <1 |
| $Mn^{II}$ | 32 |
| $Fe^{III}$ | <1 |
| $Ru^{III, IV}$ | <1 |
| $Pu^{IV}$ | <1 |
| $Co^{II}$ | <1 |
| $Ir^{IV}$ | <1 |
| $Ni^{III}$ | 12 |
| $Pt^{IV}$ | <1 |
| $Cu^{II}$ | <1 |
| $Ag^{I}$ | 10 |
| $Zn^{II}$ | <1 |
| $Cd^{II}$ | <1 |
| $Hg^{II}$ | <1 |
| $Al^{III}$ | <1 |
| $In^{III}$ | <1 |
| $Tl^{I}$ | 15 |
| $Sn^{IV}$ | <1 |
| $Pb^{II}$ | <1 |
| $Sb^{V}$ | <1 |
| $Bi^{III}$ | <1 |

As can be seen from the $K_d$ values in the above table, strontium, with a $K_d$ of 280, would not be expected to be completely separated from calcium with a $K_d$ of 101. In fact, separation of these two elements is not completely satisfactory. Separation from other metals is almost quantitative. In the practice of the present invention where the separation of strontium is from a processed nuclear fuel, this is not a problem as very little if any calcium is present. However, it must be noted that if calcium is present in the initial solution, minor amounts will be retained on the ion exchange resin and carried with the strontium and barium as an impurity. This is not critical as subsequent separation of strontium and barium may be desired and, if so, the presence of calcium presents no special problems. The above table contains $K_d$ values for the preferred composition on a particular ion exchange resin. However, this is given as an example and is not intended to limit the scope of the invention. Similar results are obtained using other resins and other solvent solutions within the above stated ranges.

Although Dowex 50 was the resin used in obtaining the values of $K_d$ in the above table and also is the resin uesd in the examples below, the invention is not limited to Dowex 50. Any other chemically and structurally similar resin can be used. Since the invention relies upon the adsorption of barium and strontium, a cation exchange resin is of course required. While weak acid exchange resins are equally applicable, it is preferred that strong acid ion exchange resins be used. It is also preferred that the resin be used in the hydrogen form. Other forms, such as sodium for example, could be used, but since it is desired to separate the other metal values from strontium and barium, use of the sodium form would require use of more reagents to remove the sodium in the preparation of the resin for a separation run.

In carrying out the invention the strontium and barium will be subsequently eluted from the resin. Elution can be accomplished by using several reagents. However, since it may be desirable to reuse the resin, acids are employed as they will return the resin to the hydrogen form. Nitric acid and hydrochloric acid are two examples of acids which may be used and nitric acid is preferred. Furthermore, it is desirable to use the acids in the concentration range of 4–6 M. With a higher molar concentration of hydrochloric acid certain metals have a tendency to readsorb on the resin. If the concentration of nitric acid is too high, the acid will attack the resin.

The present invention is particularly concerned with the separation of strontium and barium from a radioactive waste solution obtained in the processing of irradiated nuclear reactor fuel material for recovery of uranium and plutonium. Such waste solutions can be troublesome and require an additional step in carrying out the present invention. Such waste solutions often have been treated at some point with nitric acid. In such treatment, certain metals including niobium, tin, and zirconium form oxides which may be present in a colloidal state. In the colloidal state they will not form complexes but will be adsorbed on the resin, thereby contaminating the strontium fraction. This problem is solved by evaporating the waste solution to near dryness with hydrochloric acid prior to dissolution in the solvent solution. Evaporating with hydrochloric acid serves to aid the dissolution as the metals will be converted thereby to salts which are readily dissolved. Therefore, when all the metal values are not already in solution, it is preferred to evaporate to near dryness with hydrochloric acid prior to dissolution in the solvent solution.

The following examples are given to illustrate the process of the invention.

EXAMPLE I

Separation of Sr and Ba from a synthetic mixture

A hydrochloric acid solution containing $^{144}$Ce, $^{54}$Mn, $^{95}$Zr, $^{95}$Nb, $^{181}$Hf, $^{106}$Ru, $^{207}$Bi, $^{137}$Cs, $^{46}$Sc, $^{140}$La, $^{113}$Sn, $^{113}$In, $^{51}$Cr, $^{85}$Sr, and $^{140}$Ba was taken to near dryness and the moist residue was dissolved in 5 ml. of a solvent solution of 70% $H_2O$, 20% pyridine, 10% glacial acetic aicd and which was 0.1 M in glycolic acid. After passing this solution through a Dowex 50 column (1 gram) at a flowrate of 1 ml./min. the column was washed with 10 ml. portions of the solvent solution until a total of 100 ml. was passed. More than 99% of each of the above elements was eluted within 40 ml. After 90 ml. washing more than 99.99% of each element was eluted from the column while less than 0.1% of the strontium and barium was lost in the 100 ml. washing step. The latter elements were eluted from the column with 20 ml. of 5 M $HNO_3$ after washing the resin with 5 ml. $H_2O$ to remove the excess eluent solution.

EXAMPLE II

Separation of $^{90}$Sr from an old fission product mixture

A nitric acid solution of a fission product mixture (15 years old) containing 20 mg. uranium, $^{90}$Sr, $^{137}$Cs, $^{155}$Eu, $^{126}$Sn, $^{147}$Pm, etc. was evaporated several times with hydrochloric acid and then taken to near dryness. The moist residue was dissolved in 5 ml. of the solvent solution as described in Example I and passed through a 1 gram Dowex 50 column at a flowrate of 1 ml./min. (external pressure applied). The resin column was washed with 100 ml. of the solvent solution. Uranium, $^{126}$Sn, $^{155}$Eu, $^{147}$Pm, plus other fission products passed quantitatively into the first 50 ml. of wash effluent. Of the more than $7 \times 10^6$ counts per minute (c.p.m.) of $^{137}$Cs present in the initial feed solution, less than 50 c.p.m. remained in the resin column after 80 ml. of washing. Thus, more than 99.99% of the $^{137}$Cs was removed in a single operation. Less than 0.1% of the $^{90}$Sr was lost during the 100 ml. washing step. Following a 5 ml. water wash to remove excess solvent solution the $^{90}$Sr was eluted with 20 ml. of 5 M $HNO_3$ and recovered in a radiochemically pure state (except $^{90}$Y daughter activity).

EXAMPLE III

Separation of $^{89}$Sr and $^{90}$Sr from a young fission product mixture

A nitric-hydrochloric acid solution of a 6 month old fission product mixture containing 80 mg. uranium, fission alloy (an alloy prepared for use as a fuel element containing uranium and varying amounts from 0.5% to several percent of molybdenum, ruthenium, palladium, zirconium, and rhodium) plus radioactive isotopes of Ru, Sr, Zr, Nb, Y, Sn, Sb, Cs, Ce, Pm, Eu, etc. was evaporated several times with 6 M HCl and then taken to near dryness in a beaker. The moist restidue (mainly uranyl chloride) was dissolved in 10 ml. of the solvent solution, left to stand about 10 minutes and then passed through a small Dowex 50 column (1 gram) at a flowrate of 1 ml./min. (pressure applied). Following passage of the feed solution the column was washed with 100 ml. of the solvent solution. With the exception of Ce, all the elements above including uranium were quantitatively eluted from the column in this wash. Of the more than $2 \times 10^7$ c.p.m. $^{144}$Ce initially present in the feed solution less than 0.05% (<10,000 c.p.m.) remained on the column after the 100 ml. wash. Upon washing the column with an additional 20 ml. of the solvent solution, less than 0.005% (<1000 c.p.m.) of the original Ce remained. After a 5 ml. water was used to remove the excess solvent solution, the $^{89}$Sr and $^{90}$Sr were eluted with 20 ml. of 5 M $HNO_3$ and recovered in a high radiochemical purity.

It will be understood that the invention is not to be limited to the details given herein but that it may be modified within the scope of the appended claims.

The embodiments of the invention in which an exclusive property or privilege is claimed are defined as follows:

1. A process of separating strontium and barium values from a fission product waste solution containing said strontium and barium values together with lanthanide rare earth metal values and alkali metal values comprising:
   forming a feed solution containing said values dissolved in a solvent solution of water, pyridine, acetic acid and glycolic acid;
   contacting the resulting feed solution with a cation exchange resin whereby strontium and barium are absorbed on the resin while other values remain in the solution;
   separating the resin from the solution;
   and separating the strontium and barium from the resin.

2. The process of claim 1 wherein the solution containing the metal values is evaporated to near dryness with hydrochloric acid prior to formation of the feed solution in order to promote dissolution of the values.

3. The process of claim 1 wherein the solvent solution consists of 65% to 75% (volume) of water, 25% to 20% (volume) of pyridine, 10% to 5% (volume) of glacial acetic acid, said solvent solution being 0.05 M to 0.2 M in glycolic acid.

4. The process of claim 1 wherein the solvent solution consists of 70% (volume) of water, 20% (volume) of pyridine, 10% (volume) of glacial acetic acid, said solvent solution being 0.1 M in glycolic acid.

5. The process of claim 1 wherein the ion exchange resin employed is a strongly acidic cation exchange resin in the hydrogen form.

6. The process of claim 1 wherein the strontium and barium are separated from the ion exchange resin by eluting with 4 M to 6 M $HNO_3$ or 4 M to 6 M HCl.

7. The process of claim 2 wherein the solution containing the metal values is products formed in the processing of spent fuel from a nuclear reactor.

8. In the process of separating strontium and barium from a fission product waste mixture containing strontium and barium values together with lanthanide rare earth metal values and alkali metal values by dissolving the values in a solvent solution containing metal complexing ions and contacting the resulting solution with an ion exchange resin whereby only the strontium and barium are adsorbed on the resin while the other values remain in solution, the improvement therein where the solvent solution consists of water, pyridine, acetic acid and glycolic acid.

9. The improvement of claim 8 wherein the resin is an acidic cation exchange resin and the solvent solution consists of 70% (volume) of water, 20% (volume) of pyridine, 10% (volume) of glacial acetic acid, said solution being 0.1 M in glycolic acid.

References Cited

UNITED STATES PATENTS

| | | | |
|---|---|---|---|
| 3,154,500 | 10/1964 | Jansen et al. | 23—338 |
| 3,554,709 | 1/1971 | Orlandini et al. | 210—38 X |
| 3,574,531 | 4/1971 | Schulz | 23—312 X |
| 3,122,414 | 2/1964 | Horner et al. | 23—102 |
| 2,925,431 | 2/1960 | Choppin et al. | 23—338 |

CARL D. QUARFORTH, Primary Examiner

R. L. TATE, Assistant Examiner

U.S. Cl. X.R.

23—312 ME, 338; 210—38